May 24, 1927.
D. W. TIETJEN
ROLLER BEARING
Filed May 19, 1924
1,629,600
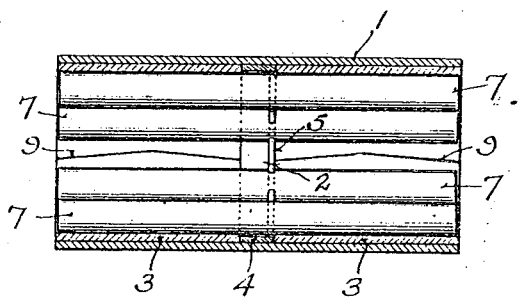
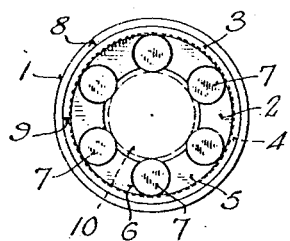 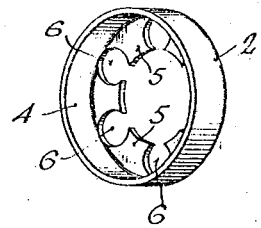
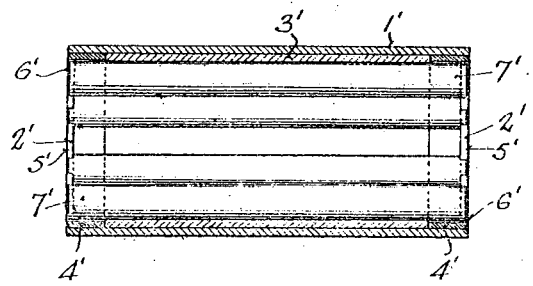 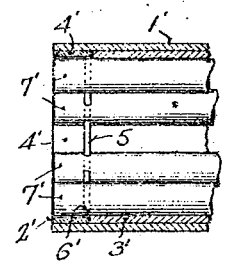
INVENTOR.
DIEDRICH W. TIETJEN
BY
ATTORNEYS.

Patented May 24, 1927.

1,629,600

UNITED STATES PATENT OFFICE.

DIEDRICH WILLIAM TIETJEN, OF NORTH MILWAUKEE, WISCONSIN, ASSIGNOR TO E. R. WAGNER MFG. COMPANY, OF NORTH MILWAUKEE, WISCONSIN, A CORPORATION OF WISCONSIN.

ROLLER BEARING.

Application filed May 19, 1924. Serial No. 714,272.

This invention relates to roller bearings.

It relates particularly to roller bearings for vehicle wheels.

An object of the invention is to provide an improved roller bearing which is efficient, durable, and which may be economically manufactured and easily assembled.

Another object is to provide an improved roller bearing having a large bearing surface for the rollers. Other objects and advantages will hereinafter appear.

For the purpose of illustrating the invention, an embodiment thereof is shown in the drawings, in which:

Figure 1 is a longitudinal central section through the bearing;

Fig. 2 is an end elevation looking toward the right in Fig. 1;

Fig. 3 is a perspective of the retainer for the rollers;

Fig. 4 is a longitudinal central section of a modified form; and

Fig. 5 is a longitudinal central section of a modified form.

The invention comprises, in general, a tubular casing or shell 1, a cup-shaped retainer 2 for the rollers, and a tubular sleeve or spacer 3 fitted within the casing to hold the retainer in position therein. The several elements specified are preferably formed of sheet metal so as to function as indicated by the drawings and as hereinafter described.

The cup-shaped retainer 2 comprises a circular rim 4 which fits snugly although rotatably within the casing 1 and lugs 5 extending transversely thereto to provide circular openings 6 for the rollers 7.

The shell or casing 1 may be made from tubing and slit longitudinally, as shown at 8, to insure a close non-rotative fit between the casing and the spacer 3. The inside diameter of casing 1 may be made slightly less than the outside diameter of the spacer 3 so that the casing will be sprung slightly when the spacer is inserted therein. A snug fit between the shell and spacer is thereby effected.

The spacer 3 may likewise be made from tubing and slit longitudinally, as shown at 9. The spacer will then contract slightly upon being inserted into the casing 1 and will press outwardly against the same when in assembled relation with respect thereto.

In the embodiment of my invention, as shown in Fig. 1, a retainer 2 is slipped into the casing 1 and a spacer 3 inserted into either end thereof to engage each side of the retainer and hold the same securely in position within the casing.

The spacers 3 are made from material of greater thickness than that used for the rim 4 of the retainer, as shown in Fig. 1. The rollers 7 will then bear upon the inner surfaces of the spacers 3 instead of the inner surface of the rim 4 or the bottom of the openings 6 when they are pressed radially outwardly by a shaft 10. A large bearing surface for the rollers is thereby provided.

When the wheel to which the bearing is applied rotates about the shaft 10, the rollers 7 will roll upon the sleeves or spacers 3.

In the modification shown in Fig. 4, a spacer 3' is fitted into the casing 1' and a retainer 2' inserted into either end of the casing to engage the spacer, the retainers facing inwardly. The spacer 3' thereby holds the two retainers in proper spaced relation with respect to each other within the casing.

The thickness of spacer 3' is made thicker than the rims 4' of the retainers, as shown, so that the rollers 7' will bear upon the spacer.

In the modification shown in Fig. 5, the parts are assembled in the same manner as shown in Fig. 4, but the retainers 2' face outwardly. This arrangement may be necessary in some cases, where there would be a slight longitudinal shifting of the rollers with respect to the casing, to prevent the ends of the rollers from slipping out of engagement with the lugs 5.

The casing 1 and spacers 3 may be solid tubes instead of being slit longitudinally.

It will be observed that the cage for the bearing rollers constitutes means for spacing the rollers apart from one another and also as a rotative carrier for the rollers which will also have a rolling contact with the sleeve lining of the casing in the rotation of the spacing carrier.

Various changes of structure may be adopted without departing from the spirit of the invention as defined by the claims.

The invention claimed is:

1. A roller-bearing comprising a tubular member, a sleeve spacer member positioned within the tubular member to form a recess between contiguous portions of the tubular member and sleeve member and constitute a lining to the tubular member throughout its major portion from its middle towards both ends, a cage member rotatively mounted in said recess, and roller-bearings mounted in the cage for rolling contact with the inner surface of the sleeve member and carried by the cage in its rotation in its recess.

2. A roller-bearing comprising a tubular member, a sleeve spacer member positioned within the tubular member to form a recess between contiguous portions of the tubular member and sleeve member, at least one of said members being slitted for holding the two members in non-rotative relation to each other, a means for spacing roller bearings and rotatively mounted in said recess, and roller-bearings carried by said spacing means for rolling contact with the inner surface of the sleeve member.

3. A roller-bearing comprising a sheet-metal casing, a sheet-metal sleeve-lining to the casing, means formed of sheet-metal for spacing roller-bearings apart from one another and rotatively mounted in the casing, and roller bearings carried by said rotative spacing means and in rolling contact with the inner surface of the sleeve-lining.

In witness whereof I have hereto affixed my signature.

DIEDRICH WILLIAM TIETJEN.